(12) United States Patent
Inami et al.

(10) Patent No.: US 10,596,999 B2
(45) Date of Patent: Mar. 24, 2020

(54) VALET KEY AND METHOD FOR CONTROLLING VALET KEY

(71) Applicant: KABUSHIKI KAISHA TOKAI RIKA DENKI SEISAKUSHO, Aichi (JP)

(72) Inventors: Yuichi Inami, Aichi (JP); Masahiko Oya, Aichi (JP); Masahiro Arakawa, Aichi (JP); Yutaka Kubo, Aichi (JP)

(73) Assignee: KABUSHIKI KAISHA TOKAI RIKA DENKI SEISAKUSHO, Aichi (JP)

(*) Notice: Subject to any disclaimer, the term of this patent is extended or adjusted under 35 U.S.C. 154(b) by 0 days.

(21) Appl. No.: 16/181,938

(22) Filed: Nov. 6, 2018

(65) Prior Publication Data

US 2019/0143939 A1     May 16, 2019

(30) Foreign Application Priority Data

Nov. 14, 2017  (JP) .................. 2017-219255

(51) Int. Cl.
*B60R 25/24*   (2013.01)
*G06F 19/00*   (2018.01)
(Continued)

(52) U.S. Cl.
CPC ............ *B60R 25/241* (2013.01); *B60R 25/01* (2013.01); *B60R 25/243* (2013.01); *G07C 9/00* (2013.01);
(Continued)

(58) Field of Classification Search
CPC ... B60R 25/01; B60R 25/241; B60R 25/2081; B60R 25/24; B60R 2325/205; B60R 25/2018; B60R 2325/103; B60R 25/243; B60R 25/25; B60R 25/252; B60R 25/255; B60R 25/257; G07C 9/00309; G07C 9/00944; G07C 5/006; G07C 5/008; G07C 5/0808; H04L 9/0819; H04L 63/102; H04L 63/107; H04L 67/12; G06Q 10/06311; G06Q 50/30; G06Q 10/06314; G06Q 10/1095; G06Q 10/20; G06Q 30/0282; G06Q 30/0283; G06Q 30/0611; G06Q 30/08; G08C 17/02; G08C 2201/40; G08C 23/04; B60L 2250/20; B60L 53/65;
(Continued)

(56) References Cited

U.S. PATENT DOCUMENTS

| | | | |
|---|---|---|---|
| 6,781,519 B1* | 8/2004 | Diaz ............... | G08C 17/02 340/12.5 |
| 2006/0114101 A1* | 6/2006 | Schambeck ......... | B60R 25/2081 340/5.61 |

(Continued)

FOREIGN PATENT DOCUMENTS

JP     2006-225976     8/2006

*Primary Examiner* — Dionne Pendleton
(74) *Attorney, Agent, or Firm* — Greenblum & Bernstein, P.L.C.

(57) ABSTRACT

A valet key operable as a vehicle key when lending a vehicle to a third person includes a state determination unit configured to determine whether or not the valet key is operable as the vehicle key when the valet key transmits a radio wave. The valet key further includes a communication subject setting unit configured to set a communication subject to which the valet key transmits the radio wave based on the determination result of the state determination unit.

7 Claims, 3 Drawing Sheets

(51) Int. Cl.
*G06Q 10/00* (2012.01)
*H04L 9/08* (2006.01)
*B60R 25/01* (2013.01)
*G07C 9/00* (2020.01)

(52) U.S. Cl.
CPC ..... *G07C 9/00309* (2013.01); *G07C 9/00571* (2013.01); *G07C 9/00857* (2013.01); *H04L 9/0819* (2013.01); *G07C 2009/0088* (2013.01); *G07C 2009/00261* (2013.01); *G07C 2009/00769* (2013.01); *G07C 2209/04* (2013.01)

(58) Field of Classification Search
CPC ............. B60W 20/00; B60W 2540/04; B60W 2540/28; B60W 40/09; G01M 17/007; H04W 12/04; H04W 12/06; H04W 12/08; H04W 4/023; Y02T 10/7005; Y02T 10/7072; Y02T 90/121; Y02T 90/128; Y02T 90/14; Y02T 90/163; Y02T 90/169; Y04S 30/14
See application file for complete search history.

(56) References Cited

U.S. PATENT DOCUMENTS

| | | | |
|---|---|---|---|
| 2010/0235026 A1* | 9/2010 | Shimizu | B60R 25/241 701/22 |
| 2018/0211231 A1* | 7/2018 | Penilla | G06Q 10/1095 |
| 2018/0257604 A1* | 9/2018 | Komeya | H04W 12/06 |
| 2019/0176758 A1* | 6/2019 | Wilding | B60R 25/2018 |

\* cited by examiner

ID-and-an-electronic-key-unique-encryption-code-registered-as-information-unique-to-the-vehicle-1.

VALET KEY AND METHOD FOR CONTROLLING VALET KEY

CROSS-REFERENCE TO RELATED APPLICATIONS

This application is based upon and claims the benefit of priority from prior Japanese Patent Application No. 2017-219255, filed on Nov. 14, 2017, the entire contents of which are incorporated herein by reference.

FIELD

This disclosure relates to a valet key used as a vehicle key when lending a vehicle to a third person and a method for controlling a valet key.

BACKGROUND

Japanese Laid-Open Patent Publication No. 2006-225976 discloses an electronic key system applicable to, for example, valet parking service in which a user lends the vehicle to a third person such as a valet. In such type of valet parking service, for example, the user hands a dedicated valet key to the third person in order to have the vehicle parked at a certain parking spot.

SUMMARY

In car sharing service, a vehicle may be used (shared) by a number of people each employing a mobile terminal, such as a smartphone, as an electronic key (vehicle key). In this case, for example, key information is registered to the mobile terminal so that the mobile terminal can be used as the vehicle key. However, for example, when using valet parking serving with such a share vehicle, the user will hesitate to hand his or her mobile terminal to a third person. The user would rather prefer to hand a separate valet key to the third person.

When handing the valet key to a third person, the valet key needs to be usable as a vehicle key. However, for example, when key information is not registered to the valet key, the valet key cannot be used as the vehicle key. Thus, the user or the third person would have to perform a certain operation to register key information to the valet key. This is inconvenient.

One embodiment is a valet key is operable as a vehicle key when lending a vehicle to a third person. The valet key includes a state determination unit and a communication subject setting unit. The state determination unit is configured to determine whether or not the valet key is operable as the vehicle key when the valet key transmits a radio wave. The communication subject setting unit is configured to set a communication subject to which the valet key transmits the radio wave based on the determination result of the state determination unit.

A further embodiment is a method for controlling a valet key that is operable as a vehicle key when lending a vehicle to a third person. The method includes determining whether or not the valet key is operable as the vehicle key when the valet key transmits a radio wave. The method further includes setting a communication subject to which the valet key transmits the radio wave based on the determination result of whether or not the valet key is operable as the vehicle key.

Other embodiments and advantages thereof will become apparent from the following description, taken in conjunction with the accompanying drawings, illustrating by way of example the principles of the invention. It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment of a valet key and a method for controlling the valet key will now be described with reference to FIGS. 1 to 5.

Figure 1:
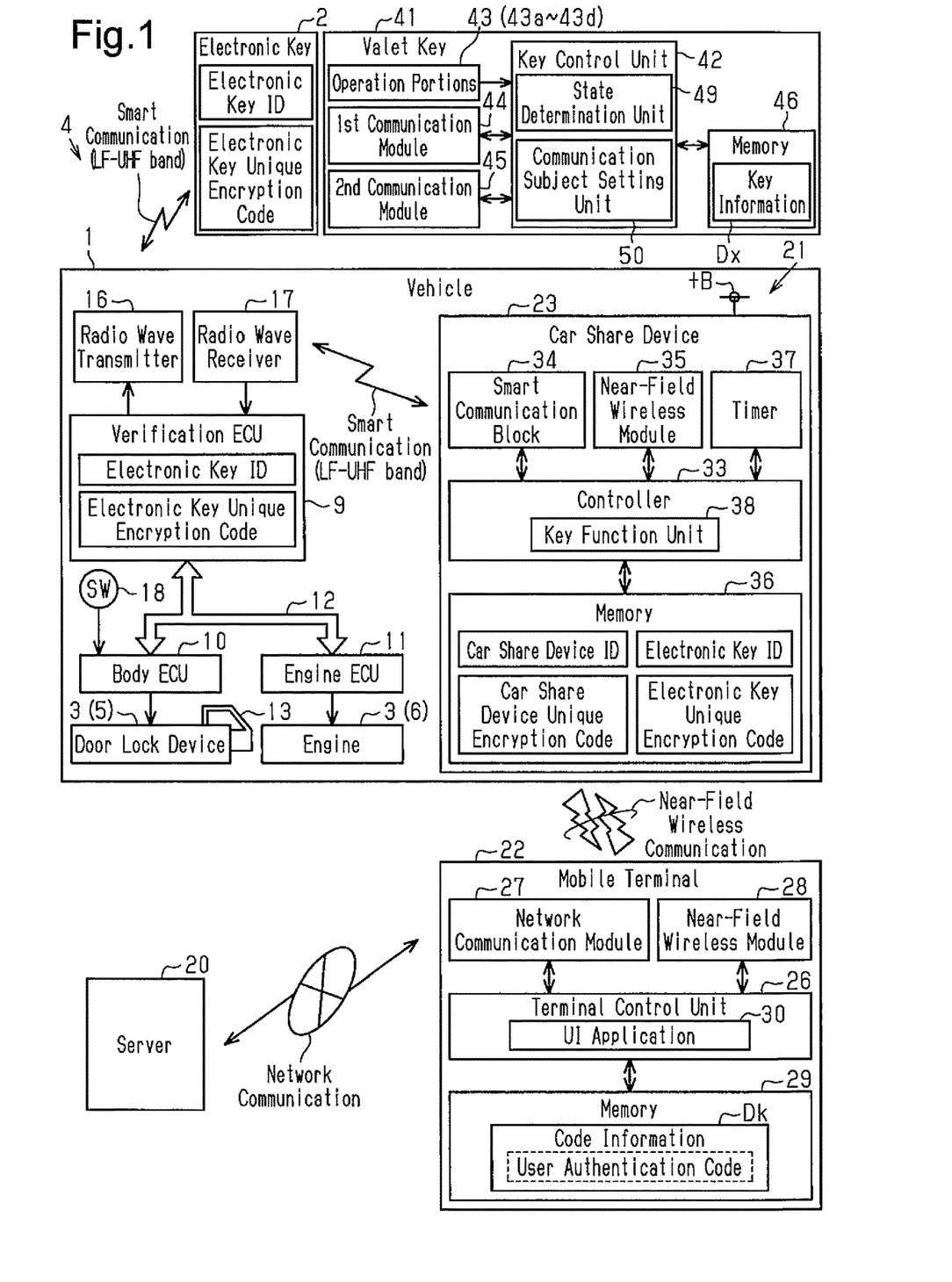
FIG. 1 is a schematic block diagram illustrating one embodiment of a car sharing system (valet key)

As illustrated in FIG. 1, a vehicle 1 is provided with an electronic key system 4. In one embodiment, the electronic key system 4 includes an electronic key 2 (vehicle key) and a verification electronic control unit (ECU) 9 that verifies the ID of the electronic key 2 through wireless communication with the electronic key 2. The verification ECU 9 actuates or permits actuation of an on-board device 3 upon ID verification accomplishment of the electronic key 2. The electronic key system 4, which is a key-operation-free system, performs electronic key ID verification (also referred to as smart verification) through short range wireless communication initiated by the vehicle 1 (verification ECU 9). In the key-operation-free system, electronic key ID verification is automatically performed without directly operating the electronic key 2. The on-board device 3 may be, for example, a door lock device 5 or an engine 6.

The vehicle 1 includes the verification ECU 9, a body ECU 10 that manages the power supply for on-board electrical devices, and an engine ECU 11 that controls the engine 6. The body ECU 10 and the engine ECU 11 are each referred to as an on-board device ECU. The ECUs 9 to 11 are electrically connected to one another by a communication line 12 in the vehicle 1. The communication line 12 is, for example, a Controller Area Network (CAN), a Local Interconnect Network (LAN), or a combination of these networks. The verification ECU 9 and the electronic key 2 each include a memory (not illustrated) that stores an electronic key ID and an electronic key unique encryption code. The electronic key ID and the electronic key unique encryption code are information unique to the electronic key 2 that is registered to the vehicle 1 and used for electronic key ID verification. The body ECU 10 controls the door lock device 5 that locks and unlocks the vehicle door 13.

The electronic key system 4 further includes a radio wave transmitter 16 and a radio wave receiver 17 that are arranged in the vehicle 1. For example, the radio wave transmitter 16 may include an exterior transmitter (not illustrated) that transmits radio waves to the outside of the vehicle 1 and an interior transmitter (not illustrated) that transmits radio waves to the inside of the vehicle 1. The radio wave transmitter 16 transmits radio waves on the low frequency (LF) band. The radio wave receiver 17 receives radio waves on the ultrahigh frequency (UHF) band. Accordingly, in the electronic key system 4, the verification ECU 9 communicates with the electronic key 2 through LF-UHF bidirectional communication.

As the electronic key 2 enters a communication area formed by a wake signal on LF radio waves transmitted from the radio wave transmitter 16, the electronic key 2 receives the wake signal and shifts from a standby state to an activated state. Upon activation of the electronic key 2, the verification ECU 9 performs ID verification (smart verification) on the electronic key 2. In a non-restrictive example, the smart verification performed between the electronic key 2 and the verification ECU 9 includes electronic key ID verification that authenticates the electronic key 2 and challenge-response verification that uses the electronic key unique encryption code. The electronic key ID verification performed under a situation in which the electronic key 2 is located outside the vehicle 1 is referred to as exterior smart verification. When exterior smart verification is accomplished, the verification ECU 9 permits or performs locking or unlocking of the vehicle door 13 with the body ECU 10.

The electronic key ID verification performed under a situation in which the electronic key 2 is located inside the vehicle 1 is referred to as interior smart verification. If interior smart verification is accomplished, the verification ECU 9 permits the shifting of devices supplied with power when an engine switch 18 is operated. For example, when the engine switch 18 is operated in a state in which the brake pedal is depressed, the verification ECU 9 starts the engine 6 with the engine ECU 11.

The vehicle 1 is provided with a car sharing system 21 that allows the vehicle 1 to be shared by a number of people. In the present example, the car sharing system 21 includes a car share device 23 installed in the vehicle 1. The car share device 23 is configured to verify the electronic key ID used by the electronic key system 4 of the vehicle 1. Further, the car share device 23 is configured to establish wireless communication with a mobile terminal 22. Encrypted code information Dk obtained from, for example, an external device such as a server 20 is registered to the mobile terminal 22. When the code information Dk is registered to the mobile terminal 22, the mobile terminal 22 is associated with the vehicle 1 (car share device 23). The car share device 23 obtains the code information Dk from the mobile terminal 22 and authenticates the code information Dk. In the present example, the car share device 23 includes an encryption code (car share device unique encryption code) configured to decode the code information Dk. The code information Dk is authenticated when decoded. After the authentication process is accomplished, the car share device 23 accepts requests from the mobile terminal 22 for actuating the on-board device 3. The mobile terminal 22 may be, for example, a smartphone. Preferably, the code information Dk is, for example, a one-time key (one-time password) that can be used only once.

The car share device 23 is independent from the hardware configuration of the electronic key system 4 and can be retrofitted to the vehicle 1. The car share device 23, for example, functions as an electronic key (vehicle key) that is valid only during the reserved time of the vehicle 1 and is similar to a spare key. In the present example, the car share device 23 cooperates with the mobile terminal 22 so that the mobile terminal 22 functions as a vehicle key in place of the electronic key 2. The car share device 23 has an electronic key function that is switched between a valid state and an invalid state. A state in which the electronic key function of the car share device 23 is valid is equivalent to a state in which an electronic key exists in the vehicle 1. A state in which the electronic key function is invalid is equivalent to a state in which an electronic key does not exist in the vehicle 1. The car share device 23 is supplied with power from a battery +B of the vehicle 1.

In a non-restrictive example, the mobile terminal 22 includes a terminal control unit 26, a network communication module 27, a near-field wireless communication module 28, and a memory 29. The terminal control unit 26 controls the operation of the mobile terminal 22. The network communication module 27 is used to establish network communication between the mobile terminal 22 and an external device such as the server 20. The near-field wireless communication module 28 is used to establish near-field wireless communication between the mobile terminal 22 and the car share device 23. The memory 29 is a data rewritable memory. The mobile terminal 22 obtains the code information Dk from the server 20 with the network communication module 27 and writes the code information Dk to the memory 29. The near-field wireless communication is performed in compliance with, for example, Bluetooth (registered trademark), preferably, Bluetooth® Low Energy (BLE).

A user interface (UI) application 30 is installed in the mobile terminal 22 to manage operation of the car sharing system 21. The UI application 30 is, for example, downloaded from the server 20 and installed in the terminal control unit 26. In the present example, a user authentication code is registered to the memory 29 of the mobile terminal 22. The user authentication code is used when the mobile terminal 22 communicates with the car share device 23 of the vehicle 1 to actuate the on-board device 3 in accordance with the operation of the mobile terminal 22. The user authentication code may be included in, for example, the code information Dk. The user authentication code may be, for example, a random number of which value changes whenever generated. The user authentication code may be registered in advance to the car sharing system 21 or generated when the vehicle 1 is used.

In a non-restrictive example, the car share device 23 includes a controller 33, a smart communication block 34, a near-field wireless module 35, a memory 36, and a timer 37. The controller 33 controls operation of the car share device 23. The smart communication block 34 is used to establish smart communication (short range wireless communication) between the car share device 23 and the electronic key system 4 (verification ECU 9). The near-field wireless module 35 is used to establish near-field wireless communication between the mobile terminal 22 and the car share device 23.

The memory 36 is a data rewritable memory. The memory 36 stores a car share device ID, a car share device unique encryption code, the electronic key ID, and the electronic key unique encryption code. The car share device ID and the car share device unique encryption code are information unique to the car share device 23. The car share device unique encryption code is used to decode the code information Dk used for encrypted communication between the mobile terminal 22 and the car share device 23. The car share device unique encryption code may be stored in the server 20. The mobile terminal 22 may obtain the code information Dk, which is encrypted by the car share device unique encryption code, from the server 20. The car share device ID is, for example, associated with a vehicle ID (vehicle body number). This associates the car share device 23 with the vehicle 1. As described above, the electronic key ID and the electronic key unique encryption code are information unique to the electronic key 2 and used for electronic key ID verification (in the present example, smart verification) performed with the electronic key system 4. The timer 37 manages the date and time in the car share device 23. The timer 37 is implemented by, for example, a soft timer.

The car share device 23 includes a key function unit 38 that performs electronic key ID verification (in the present example, smart verification) through smart communication established by the smart communication block 34 between the electronic key system 4 (verification ECU 9) and the car share device 23. The key function unit 38 is arranged in the controller 33. For example, the car share device 23 includes one or more processors and a memory storing one or more commands. The one or more processors execute commands so that the controller 33 functions as the key function unit 38. The key function unit 38 obtains the code information Dk from the mobile terminal 22 and authenticates the code information Dk. When authentication of the code information Dk is accomplished, the key function unit 38 is allowed to perform electronic key ID verification through smart communication with the verification ECU 9. For example, when the mobile terminal 22 is operated to actuate the on-board device 3, the key function unit 38 performs electronic key ID verification (in the present example, smart verification) between the car share device 23 and the verification ECU 9 through a process similar to the electronic key ID verification performed between the electronic key 2 and the verification ECU 9. When electronic key ID verification is accomplished, actuation of the on-board device 3 is performed or permitted in accordance with operation of the mobile terminal 22.

Figure 2:
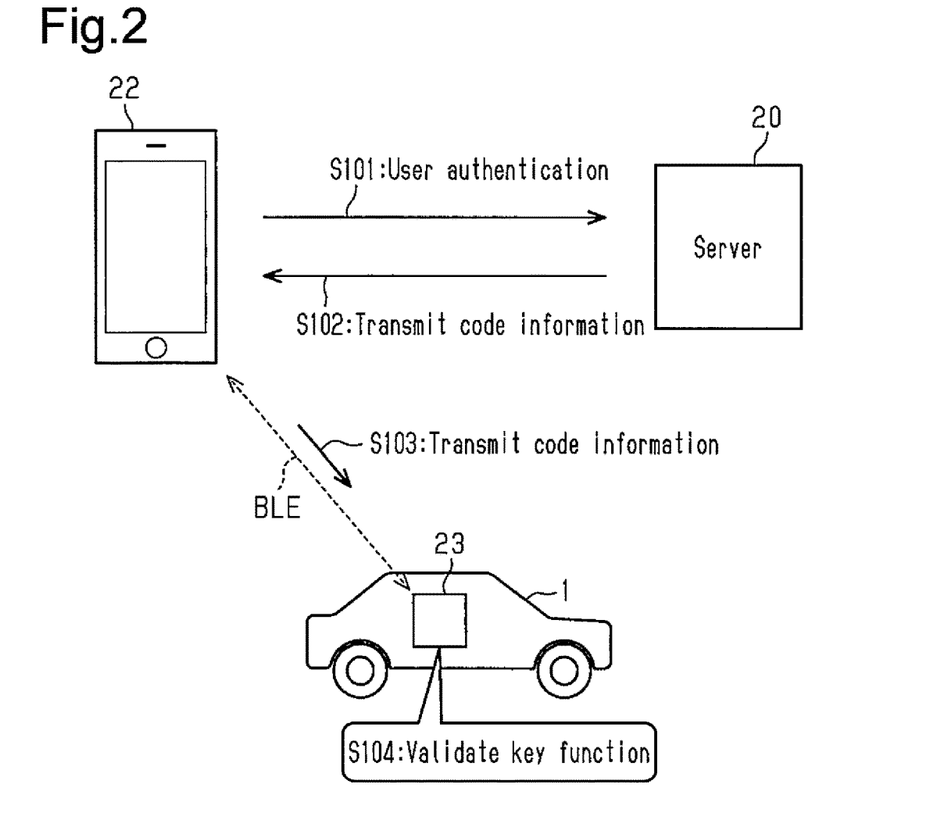
FIG. 2 is a diagram illustrating the communication sequence for code information authentication.

FIG. 2 illustrates an example of a communication sequence for code information authentication. When reserving the vehicle 1 with the car sharing system 21, code information authentication is performed in accordance with the communication sequence of FIG. 2. In step S101, the server 20 authenticates the user of the mobile terminal 22 (user reserving vehicle 1) through network communication with the mobile terminal 22 (the UI application 30). For example, user authentication is performed with a user ID and password that are input to the mobile terminal 22 (UI application 30). In the user authentication, a usage reservation procedure is performed to register reservation information of the vehicle 1. The reservation information of the vehicle 1 includes, for example, the reserved vehicle and the reserved date and time. After the server 20 authenticates the user with the user ID and the password, the process proceeds to step S102. If user authentication is not accomplished, the process is forcibly terminated.

In step S102, the server 20 generates the code information Dk and transmits the code information Dk to the mobile terminal 22 through network communication. For example, the car share device unique encryption code of the car share device 23, which is installed in the vehicle 1 (reserved vehicle), may be registered to the server 20. The server 20 may generate the code information Dk using the car share device unique encryption code. For example, the server 20 uses an encryption expression (encryption algorithm) to encrypt plain text with the car share device unique encryption code and use the encrypted text as the code information Dk. The encrypted plain text (i.e., code information Dk) may include, for example, the reserved date and time of the vehicle 1, a terminal ID unique to the mobile terminal 22, and the user authentication code used as an encryption code for establishing encrypted communication between the mobile terminal 22 and the car share device 23.

In step S103, the mobile terminal 22 (UI application 30) establishes near-field wireless communication (in the present example, BLE) with the car share device 23 and transmits the code information Dk to the car share device 23 of the vehicle 1. For example, the Bluetooth function is validated to establish BLE communication. When receiving the car share device unique encryption code, the car share device 23 authenticates the code information Dk. In the present example, the car share device 23 uses the car share device unique encryption code to decode the code information Dk. When decoding of the code information Dk is accomplished, the car share device 23 determines that the code information Dk has been correctly received from the mobile terminal 22. When authentication is accomplished, the car share device 23 extracts the reservation date and time, the terminal ID, and the user authentication code.

When authentication of the code information Dk is accomplished, in step S104, the car share device 23 switches the electronic key function (key function unit 38) from an invalid state to a valid state. This allows the car share device 23 (key function unit 38) to execute electronic key ID verification through LF-UHF bidirectional communication with the verification ECU 9. In the present example, the car share device 23 stores the code information Dk (e.g., user authentication code) in the memory 36. After the code information Dk, which includes the user authentication code, is stored in the memory 36, the mobile terminal 22 and the car share device 23 both shift to an authentication completion state. This allows the mobile terminal 22 to be used in place of the electronic key 2 as an electronic key (vehicle key) of the vehicle 1.

Figure 3:
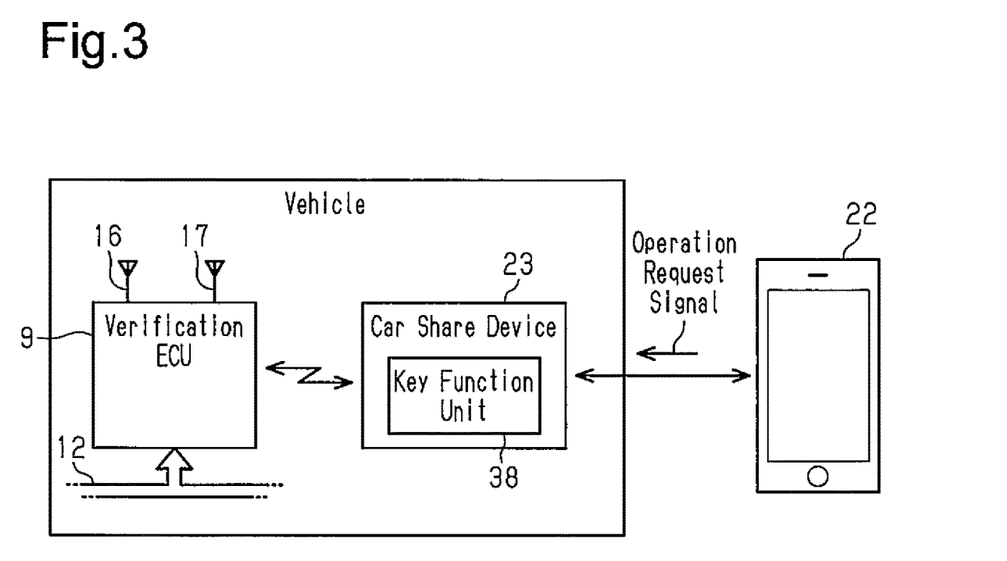
FIG. 3 is a diagram illustrating an example of a case in which a vehicle is operated with a mobile terminal.

Referring to FIG. 3, the user operates and activates an operation request button of the mobile terminal 22, which has been shifted to the authentication completion state, to transmit an operation request signal from the mobile terminal 22 to the car share device 23. The operation request button is, for example, shown on a display of the mobile terminal 22, and used to actuate the on-board device 3. The operation request button may be, for example, an unlock request button for unlocking the vehicle door 13, a lock request button for locking the vehicle door 13, an engine start button for starting the engine 6, or the like.

The UI application 30 of the mobile terminal 22 encrypts an operation request signal, which corresponds to the operation request button, with an encryption code (e.g., user authentication code). In a non-restrictive example, the operation request signal may include a device actuation command corresponding to the operation request button. The UI application 30 of the mobile terminal 22 transmits the encrypted operation request signal to the car share device 23.

When the car share device 23 receives the operation request signal, the car share device 23 communicates with the verification ECU 9 of the electronic key system 4 and actuates the on-board device 3 in accordance with the received operation request signal. In a non-restrictive example, the car share device 23 establishes smart communication with the verification ECU 9 of the electronic key system 4 through the smart communication block 34 and sends a device actuation command and the electronic key ID to the verification ECU 9. The verification ECU 9 performs electronic key ID verification and sends the device actuation command to the ECU of the corresponding on-board device when the electronic key ID verification is accomplished to actuate the corresponding on-board device 3.

For example, if the device actuation command is an unlock request command for the vehicle door 13, the body ECU 10 actuates the door lock device 5 to unlock the vehicle door 13. If the device actuation command is a lock request command for the vehicle door 13, the body ECU 10 actuates the door lock device 5 to lock the vehicle door 13. If the device actuation command is a starting request command for the engine 6, the engine ECU 11 permits starting of the engine 6. For example, if the engine switch 18 is operated when the brake pedal is depressed, the engine ECU 11 starts the engine 6. In addition to electronic key ID verification, challenge-response authentication using the electronic key unique encryption code may be performed between the verification ECU 9 and the car share device 23 if necessary. In the same manner as the smart verification performed between the electronic key 2 and the verification ECU 9, smart verification may be performed between the car share device 23 and the verification ECU 9.

Returning to FIG. 1, the car sharing system 21 is applicable to a valet parking system for lending the vehicle 1 to a valet (i.e., asking for the vehicle to be parked). In the present example, when lending the vehicle 1 to a third person such as a valet, a valet key 41 is handed to the third person as the vehicle key (electronic key).

The valet key 41 includes a key control unit 42, operation portions 43, a first communication module 44, a second communication module 45, and a memory 46. The key control unit 42 controls the operation of the valet key 41. The operation portions 43 are used when the user operates the valet key 41. The first communication module 44 is used for wireless communication (in present example, Bluetooth communication) between the mobile terminal 22 and the valet key 41. The second communication module 45 is used for wireless communication (in the present example, Bluetooth communication) between the vehicle 1 (in the present example, the car share device 23) and the valet key 41. The memory 36 is, for example, a data rewritable memory and stores key information Dx. The key information Dx may be, for example, the code information Dk or the user authentication code.

The key information Dx is registered to the memory 46 to allow the valet key 41 to function as the vehicle key (electronic key) of the vehicle 1. In a non-restrictive example, the registration of the key information Dx to the valet key 41 may be performed by requesting for the key information Dx from the valet key 41 via the mobile terminal 22 to the server 20 and obtaining the key information Dx from the server 20. Alternatively, the valet key 41 may directly obtain the key information Dx from the server 20.

In a non-restrictive example, the operation portions 43 include a lock operation portion 43a, which is operated the vehicle door 13, and an unlock operation portion 43b, which is operated to unlock the vehicle door 13. In the present example, the operation portions 43 further include a first operation portion 43c operated to initiate use of the valet key 41 (car sharing system 21) and a second operation portion 43d operated to terminate use of the valet key 41 (car sharing system 21). The operation portions 43a to 43d may be, for example, push buttons. The first operation portion 43c may be used, for example, when initiating near-distance wireless communication (Bluetooth communication) with the valet key 41. When use of the valet key 41 is initiated, the vehicle 1 can be used with the valet key 41. When use of the valet key 41 is terminated, the key function of the valet key 41 is invalidated and the vehicle 1 thereby cannot be used with the valet key 41.

The valet key 41 includes a communication subject setting function for switching the communication subject in accordance with the current state of the valet key 41. In the present example, when the valet key 41 cannot function as the vehicle key, the communication subject setting function sets the communication subject of the valet key 41 to the mobile terminal 22. When the valet key 41 can function as the vehicle key, the communication subject setting function sets the communication subject of the valet key 41 to the vehicle 1 (in the present example, car share device 23).

The valet key 41 includes a state determination unit 49 that determines whether or not the valet key 41 can function as the vehicle key when transmitting radio waves. For example, the valet key 41 includes one or more processors and a memory storing one or more commands. The one or more processors execute commands so that the key control unit 42 functions as the state determination unit 49. For example, the state determination unit 49 checks whether or not the key function of the valet key 41 is valid to determine whether or not the valet key 41 can function as the vehicle key. Alternatively, the state determination unit 49 may determine whether or not the valet key 41 includes the key information Dx to determine whether or not the valet key 41 can function as the vehicle key. As described above, the key information Dx may be the code information Dk or the user authentication code. To check whether the key function of the valet key 41 is valid, for example, the state determination unit 49 may check whether or not the key control unit 42 has been activated or whether or not the key control unit 42 is valid (operable based on key information Dx).

The valet key 41 includes a communication subject setting unit 50 that switches the communication subject of radio wave transmission based on the determination result of the state determination unit 49. For example, the one or more processors of the valet key 41 execute commands so that the key control unit 42 functions as the communication subject setting unit 50. The communication subject setting unit 50 sets the communication subject of the valet key 41 to the vehicle 1 or the mobile terminal 22 based on the determination result of the state determination unit 49. In the present example, when the key function of the valet key 41 is not valid or when the valet key 41 does not include the key information Dx, the communication subject setting unit 50 selects the mobile terminal 22 as the communication subject. When the key function of the valet key 41 is valid or the valet key 41 includes the key information Dx, the communication subject setting unit 50 selects the vehicle 1 (in the present example, car share device 23) as the communication subject.

The operation of the car sharing system 21 and the valet key 41 will now be described with reference to FIGS. 4 and 5.

Figure 4:
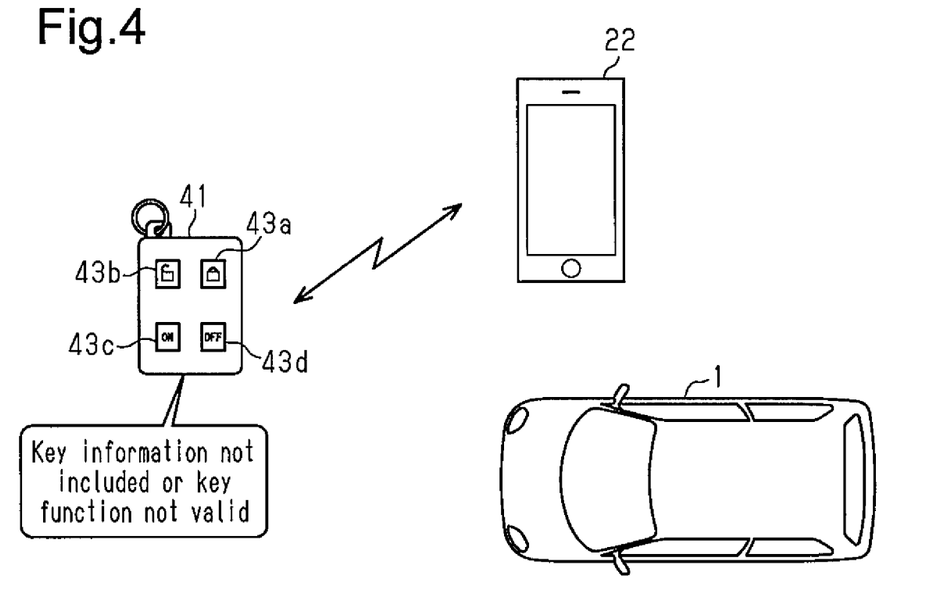
FIG. 4 is a diagram illustrating a case in which a communication subject of the valet key is set in the mobile terminal.

FIG. 4 illustrates a state in which the key function of the valet key 41 is not valid or the key information Dx is not included in the valet key 41. Thus, the communication subject of the valet key 41 is set to the mobile terminal 22. In the present example, regardless of whether the person using the car sharing system 21 is a user or a third person (e.g., valet), the first operation portion 43c needs to be operated to use the valet key 41. When the first operation portion 43c is operated, the valet key 41 performs a process to initiate near-field wireless communication (in the present example, BLE).

In this case, to select a communication subject to which radio waves are transmitted through near-field wireless communication, when the first operation portion 43c of the valet key 41 is operated, for example, the state determination unit 49 checks whether or not the key information Dx is registered to the memory 46. Further, the state determination unit 49 detects the operation state of the processor(s) (i.e., CPU(s)) of the valet key 41 and determines whether or not the key control unit 42 is set in a valid state to check whether or not the key function of the valet key 41 is valid.

In the case of FIG. 4, the state determination unit 49 determines that the key information Dx is not registered to the memory 46 of the valet key 41 or determines that the key function of the valet key 41 is not valid. In this case, the state determination unit 49 determines that the valet key 41 is not operable as the vehicle key and notifies the communication subject setting unit 50 of the determination result.

In response to the notification that the valet key 41 not operable as the vehicle key, the communication subject setting unit 50 sets the communication subject, to which radio waves from the valet key 41 are transmitted, to the mobile terminal 22. In this case, the valet key 41 establishes near-distance wireless communication (BLE communication) via the first communication module 44 with the mobile terminal 22 to acquire the key information Dx and switch the key function (key control unit 42) to a valid state.

In a non-restrictive example, the valet key 41 acquires the key information Dx from the server 20 via the mobile terminal 22. For example, the valet key 41 sends a key information acquisition request to the mobile terminal 22, and the mobile terminal 22 sends the key information acquisition request to the server 20. Then, the server 20 generates the key information Dx for the valet key 41, which sent the key information acquisition request. The key information Dx is sent via the mobile terminal 22 to the valet key 41. In this case, preferably, the key information Dx registered to the valet key 41 is code information Dk that has newly been generated in the server 20 or the user authentication code.

Alternatively, when the key information Dx that is to be registered to the valet key 41 has already been stored in the mobile terminal 22, the valet key 41 may directly acquire the key information Dx from the mobile terminal 22 instead of acquiring new key information Dx from the server 20. For example, the mobile terminal 22 acquires the key information Dx for the valet key 41 together with the code information Dk from the server 20. In this case, there is no need to establish communication between the server 20 and the mobile terminal 22. This facilitates the registration of the key information Dx to the valet key 41.

Further, the valet key 41, for example, authenticates the key information Dx through communication via communication with the mobile terminal 22 (or server 20) to switch the key function of the valet key 41 from an invalid state to a valid state. In the present example, after the key information Dx acquired by the valet key 41 validates the key function of the valet key 41, near-field wireless communication (BLE communication) is established between the valet key 41 and the vehicle 1. This allows the valet key 41 to be used as the vehicle key.

Figure 5:
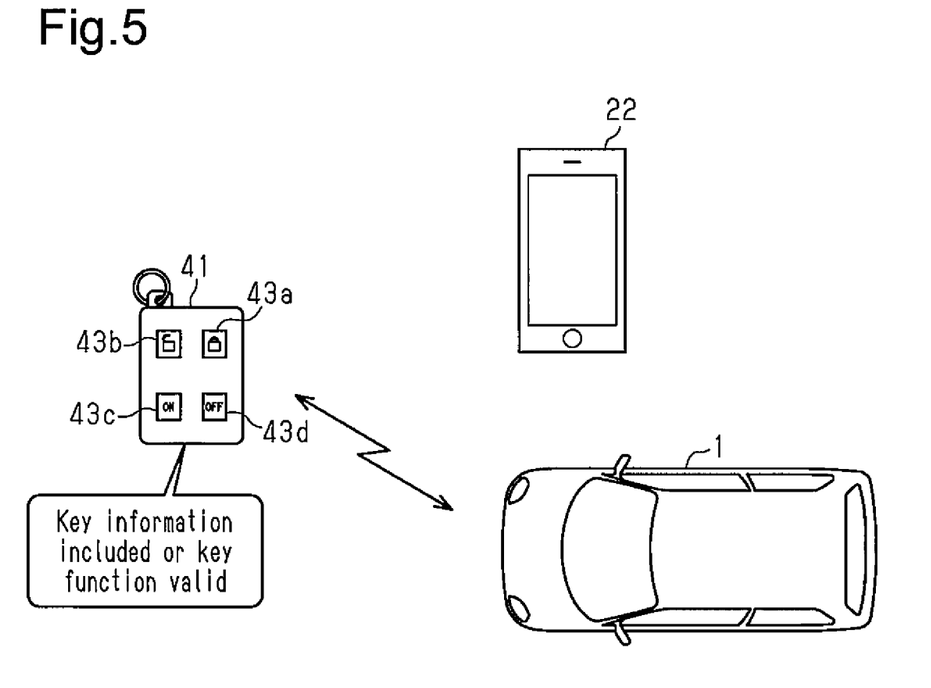
FIG. 5 is a diagram illustrating a case in which a communication subject of the valet key is set in a vehicle.

FIG. 5 illustrates a case in which the key information of the valet key 41 is valid or the valet key 41 includes the key information Dx. Thus, the communication subject of the valet key 41 is set to the vehicle 1. In the same manner as FIG. 4, the user or third person (e.g., valet) of the car sharing system 21 operates the first operation portion 43c to use the valet key 41. When the first operation portion 43c is operated, the state determination unit 49 checks whether or not the key information Dx is registered to the memory 46 and whether or not the key function of the valet key 41 is valid. In the case of FIG. 5, the key information Dx is registered, and the key function of the valet key 41 is valid. Thus, the state determination unit 49 determines that the valet key 41 is operable as the vehicle key and notifies the communication subject setting unit 50 of the determination result.

In response to the notification that the valet key 41 is operable as the vehicle key, the communication subject setting unit 50 sets the communication subject, to which radio waves are transmitted from the valet key 41, to the vehicle 1. In this case, the valet key 41 establishes near-wireless communication (BLE communication) via the second communication module 45 with the vehicle 1 (in the present example, car share device 23). This allows the valet key 41 to be used as the vehicle key. For example, when the mobile terminal 22 is used as the vehicle key, the valet key 41 will be usable by performing a process that is the same as the process performed between the mobile terminal 22 and the car share device 23.

The valet key 41 of the present embodiment has the advantages described below.

The valet key 41 automatically determines the communication subject (in the present embodiment, mobile terminal 22 or vehicle 1) when transmitting radio waves. Thus, the user including the third person does not need to be particularly aware of the communication subject of the valet key 41 to communicate with the presently suitable communication subject. This improves convenience when using the valet key 41.

When an operation portion 43 (in the present example, first operation portion 43c) is operated, the valet key 41 automatically determines the communication subject that is to be presently connected. Thus, even if the valet key 41 does not include a display, the user will be able to use the valet key 41 through a simple operation. Further, there is no need for the valet key 41 to separately include an operation portion for communication with the vehicle 1 and an operation portion for communication with the mobile terminal 22. This reduces the number of operation portions 43 in the valet key 41, which, in turn, reduces the cost and size of the valet key 41.

When transmitting radio waves in response to the operation of an operation portion 43 (in the present example, first operation portion 43c), the state determination unit 49 determines whether or not the valet key 41 is operable as the vehicle key. This allows the communication subject of the valet key 41 to be set at a suitable timing for initiating radio wave transmission.

In the present example, the state determination unit 49 determines whether or not the valet key 41 is operable as a vehicle key by checking whether or not the key information Dx (e.g., code information Dk or user authentication code) is registered in the memory 46 and checking whether or not the key function of the valet key 41 is valid. When the valet key 41 does not include the key information Dx or when the key function of the valet key 41 is not valid, the communication subject setting unit 50 selects the mobile terminal 22 as the communication subject. When the valet key 41 includes the key information Dx or when the key function of the valet key 41 is valid, the communication subject setting unit 50 selects the vehicle 1 as the communication subject. With this configuration, even if the valet key 41 is not operable as the vehicle key, the valet key 41 automatically acquires the key information Dx and validates the key function without the need for a special additional operation.

Further, the valet key 41 initiates communication with the vehicle 1 as long as the valet key 41 is operable as the vehicle key.

The valet key 41 is suitable for use with the vehicle 1 provided with the car sharing system 21. In the car sharing system 21, the mobile terminal 22 is used as the vehicle key to operate the vehicle 1. When using valet parking service with the car sharing system 21, the user does not have to hand the mobile terminal 22 to a third person. The user hands the valet key 41 to the third person. When handing the valet key 41 to the third person, the valet key 41 initiates communication with the vehicle 1 as long as the valet key 41 is operable as the vehicle key. In the conventional art, however, when the valet key 41 is not operable as the vehicle key, there is a need to perform an additional operation for registering the key information Dx to the valet key 41 or for validating the key function. The valet key 41 of the present embodiment eliminates the need to perform such an additional operation and automatically sets the communication subject in accordance with the present state of the valet key 41. Accordingly, the user (including third person) can use the valet key 41 without the need to be aware of the communication subject of the valet key 41.

The vehicle 1 of the car sharing system 21 is not limited to a typical commercial vehicle and may be an automobile shared by a group such as a family. In this case, for example, if a family member (family user) other than the main user, who is the owner of the vehicle 1, uses the vehicle 1, a vehicle usage request is transmitted from the mobile terminal 22 of the family user to the mobile terminal 22 of the main user. When the mobile terminal 22 of the main user receives the vehicle usage request and the main user operates the mobile terminal 22 to permit use of the vehicle 1, the mobile terminal 22 of the main user transmits usage permission to the mobile terminal 22 of the family user.

After the usage permission is transmitted to the mobile terminal 22 of the family user, the mobile terminal 22 of the family user (or mobile terminal 22 of main user) acquires the code information Dx from the server 20 and registers the code information Dx to the mobile terminal 22 of the family user. For example, the server 20 generates the code information Dk that is registered to the mobile terminal 22 of the family user and transmits the code information Dk to the mobile terminal 22 through network communication. The code information Dk may include a reservation time and date, a terminal ID of the mobile terminal 22 of the family user, and user authentication code registered to the mobile terminal 22 of the family user. Preferably, the code information Dk is transmitted as encrypted data from the server 20 to the mobile terminal 22 of the family user.

When receiving the code information Dk from the server 20, the mobile terminal 22 of the family user writes the code information Dk to the memory 29. As a result, the mobile terminal 22 of the family user becomes operable as the vehicle key. In this manner, the vehicle 1 can be shared by members of a group such as a family.

It should be apparent to those skilled in the art that the foregoing embodiments may be implemented in many other specific forms without departing from the scope of this disclosure. Particularly, it should be understood that the foregoing embodiments may be implemented in the following forms.

In the above embodiment, when the first operation portion 43c is operated, the state determination unit 49 determines whether or not the valet key 41 is operable as a vehicle key. Instead, when an operation portion 43 other than the operation portion 43c (e.g., operation portion 43a, 43b or any other operation portion) is operated, the state determination unit 49 may determine whether or not the valet key 41 is operable as a vehicle key. Alternatively, instead of operation of an operation portion 43, at a certain timing, the state determination unit 49 may determine whether or not the valet key 41 is operable as the vehicle key.

In the valet key 41, the first communication module 44 and the second communication module 45 do not have to be configured as separate module components and may be configured as a single module component.

The valet key 41 is not limited to the configuration of the above embodiment and may have any configuration.

The determination of whether or not the valet key 41 is operable as the vehicle key does not have to be performed by checking whether or not the key information Dx is registered or whether or not the key function of the valet key 41 is valid.

The communication subject is not limited to the vehicle 1 and the mobile terminal 22 and may be a different terminal or device.

The mobile terminal 22, the car share device 23, and the valet key 41 may acquire the user authentication code through any process.

The code information Dk does not have to be encrypted by the car share device unique encryption code and may be encrypted by any other encryption code.

The content of the code information Dk can be changed to one other than that of the above embodiment.

The code information Dk does not have to be generated by the server 20 and may be generated by any other external device.

The condition for switching the key function unit 38 from an invalid state to a valid state is not limited to the condition described above and may be any other condition.

The engine 6 may be started by, for example, operating an "engine start" button shown on the display of the mobile terminal 22.

In the smart verification of the key-operation-free system (electronic key system 4), the exterior transmitter and the interior transmitter do not have to be used to determine whether the electronic key 2 is located inside the vehicle 1 or outside the vehicle 1. For example, left and right antennas (LF antennas) may be arranged on the vehicle body, and the combination of the response of the electronic key 2 to the radio waves transmitted from each antenna may be checked to determine whether the electronic key 2 is located inside the vehicle 1 or outside the vehicle 1.

The smart verification of the electronic key system 4 does not have to perform both electronic key ID verification and challenge-response verification. As long as electronic key ID verification is performed, any verification process may be performed. Further, any verification may be performed in lieu of the challenge-response verification.

In the electronic key system 4, instead of using the verification ECU 9, the electronic key 2 may initiate wireless communication and execute electronic key ID verification.

The electronic key 2 is not limited to a Smart Key (registered trademark) and may be any other wireless key.

The near-field wireless communication is not limited to Bluetooth communication and may be of any type of communication protocol.

The code information Dk is not limited to a one-time key and may be any information of which use is restricted.

The encryption code used for encrypted communication may be, for example, any one of the car share device unique encryption code, the user authentication code, and the electronic key unique encryption code. For example, the encryption code used during a process may be switched to improve communication security.

Communication between the verification ECU 9 (electronic key system 4) and the car share device 23 is not limited to wireless communication and may be wired communication.

There is no limit to where the car share device 23 can be installed.

The mobile terminal 22 is not limited to a smartphone and may be any other mobile terminal.

All examples and conditional language recited herein are intended for pedagogical purposes to aid the reader in understanding the principles of the invention and the concepts contributed by the inventors to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

The invention claimed is:

1. A valet key operable as a vehicle key when lending a vehicle to a third person, the valet key comprising:
    a state determiner that determines whether or not the valet key is operable as the vehicle key when the valet key transmits a radio wave;
    a communication subject setter that sets a communication subject to which the valet key transmits the radio wave based on the determination result of the state determiner;
    one or more processors wherein the one or more processors execute commands so that the valet key functions as a state determiner and as a communication subject setter;
    a memory that stores key information required for actuating the valet key as the vehicle key, wherein
    the state determiner determines whether or not the key information is stored in the memory, and
    the communication subject setter
        sets the communication subject of the valet key to a mobile terminal associated with the vehicle in a case where the key information is not stored in the memory, and
        sets the communication subject of the valet key to the vehicle in a case where the key information is stored in the memory.

2. The valet key according to claim 1, further comprising:
    an operation portion operable by a user,
    wherein the state determiner determines whether or not the valet key is operable as the vehicle key when the operation portion is operated so that the valet key transmits the radio wave.

3. The valet key according to claim 1, wherein
    the valet key is usable in a car sharing system for the vehicle,
    the car sharing system includes a car share device that performs wireless communication with the mobile terminal that functions as the vehicle key when code information is registered to the mobile terminal, and
    the car share device authenticates the code information through wireless communication with the mobile terminal and permits actuation of an on-board device of the vehicle with an electronic key system for the vehicle when the mobile terminal is operated after the code information is authenticated.

4. A valet key operable as a vehicle key when lending a vehicle to a third person, the valet key comprising:
    a state determiner that determines whether or not the valet key is operable as the vehicle key when the valet key transmits a radio wave;
    a communication subject setter that sets a communication subject to which the valet key transmits the radio wave based on the determination result of the state determiner;
    and one or more processors wherein the one or more processors execute commands so that the valet key functions as a state determiner and as a communication subject setter, wherein
    the state determiner determines whether or not a key function of the valet key is valid, and
    the communication subject setter
        sets the communication subject of the valet key to a mobile terminal associated with the vehicle in a case where the key function is not valid, and
        sets the communication subject of the valet key to the vehicle in a case where the key function is valid.

5. The valet key according to claim 4, further comprising:
    an operation portion operable by a user,
    wherein the state determiner determines whether or not the valet key is operable as the vehicle key when the operation portion is operated so that the valet key transmits the radio wave.

6. The valet key according to claim 4, wherein
    the valet key is usable in a car sharing system for the vehicle,
    the car sharing system includes a car share device that performs wireless communication with the mobile terminal that functions as the vehicle key when code information is registered to the mobile terminal, and
    the car share device authenticates the code information through wireless communication with the mobile terminal and permits actuation of an on-board device of the vehicle with an electronic key system for the vehicle when the mobile terminal is operated after the code information is authenticated.

7. A method for controlling a valet key that is operable as a vehicle key when lending a vehicle to a third person, the method comprising:
    determining whether or not the valet key is operable as the vehicle key when the valet key transmits a radio wave; and
    setting a communication subject to which the valet key transmits the radio wave based on the determination result of whether or not the valet key is operable as the vehicle key, wherein
    the determining includes determining whether or not a key function of the valet key is valid, and
    the setting includes
        setting the communication subject of the valet key to a mobile terminal associated with the vehicle in a case where the key function is not valid; and
        setting the communication subject of the valet key to the vehicle in a case where the key function is valid.

* * * * *